Oct. 12, 1954   W. H. CHERRY   2,691,764
SAMPLING APPARATUS
Filed Aug. 14, 1950
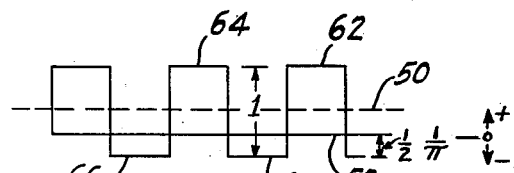
Fig_1
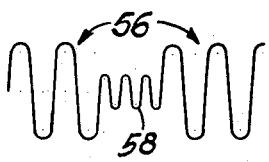
Fig_2A
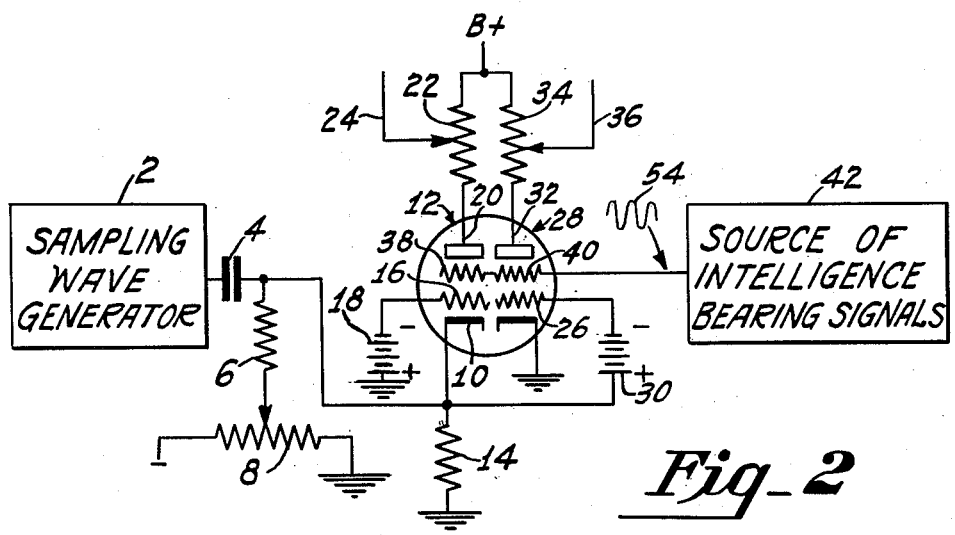
Fig_2
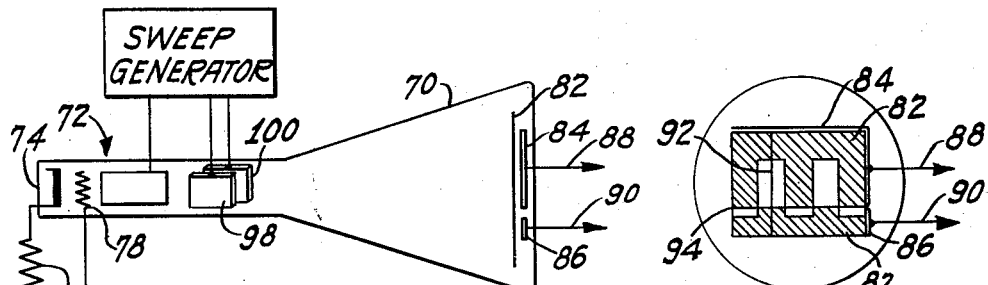
Fig_3
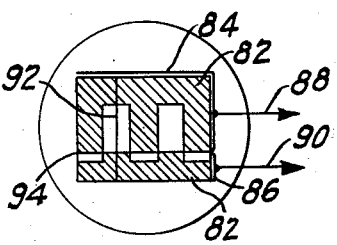
Fig_3A
INVENTOR
William H. Cherry
ATTORNEY

Patented Oct. 12, 1954

2,691,764

UNITED STATES PATENT OFFICE 2,691,764

SAMPLING APPARATUS

William H. Cherry, Princeton, N. J., assignor to Radio Corporation of America, a corporation of Delaware Application August 14, 1950, Serial No. 179,198

The terminal 15 years of the term of the patent to be granted has been disclaimed 2 Claims. (Cl. 332—49)

This invention relates to sampling apparatus and in particular to sampling apparatus employing sampling waves other than a series of narrow pulses.

In the art of time division multiplying each of several different channels of information are sampled during very short intervals and these samples are interleaved in a predetermined sequence at the transmitter. At the receiver the wave from these interleaved samples is applied to a distributor. The distributor reforms the samples and applies those samples corresponding to a given channel to one output and those corresponding to another channel to a separate output. If, in accordance with well established principles, the samples are infinitely narrow and occur at a rate not exceeding twice the cut off frequency of the transmitting medium, no cross talk is introduced between them.

However, in practice, there are various reasons why the use of extremely narrow pulses is not desirable. In the first place, they must have extremely high amplitudes in order to have sufficient power to effect satisfactory sampling. In the second place, slight variations in phase introduce a large percentage of cross talk. Furthermore, noise can effectively change the position of these samples so as to produce cross talk. Therefore, in previous methods and apparatus a compromise has been made between the amount of cross talk produced when the pulses are widened and the increase in modulation power thus derived.

In accordance with this invention, however, it becomes possible to employ widened samples of the different information channels in such a manner as to effectively simulate the operation of narrow pulse sampling but without the attendant difficulties noted above.

Therefore, it is an object of this invention to simulate narrow pulse sampling with wide pulses.

Another object is to secure a time division multiplex system using wide pulse sampling.

These objectives can be obtained by setting the D. C. level of the sampling wave at a proper value before it is applied to the sampler where it is modulated by the intelligence bearing signals present in the different channels.

The above objects, as well as various advantages to be derived from the use of this invention, will be better understood from a detailed consideration of the drawings in which:

Figure 1 illustrate a type of wave form which may be employed as a sampling wave;

Figure 2 illustrates in schematic form apparatus for carrying out the principles of this invention employing ordinary amplifiers;

Figure 2A illustrates a wave form showing qualitatively the effect obtained through employing the apparatus of Figure 2;

Figure 3 illustrates how a special type of cathode ray tube may be employed to perform the function of generating a sampling wave form having a proper D. C. level and also the function of multiplying it by the desired intelligence bearing signal; and Figure 3A illustrates a target and mask structure such as employed in the cathode ray tube of the apparatus shown in Figure 3.

If a series of narrow pulses is subjected to a Fourier analysis the result will be (a) $f(t) = 1 + 2 \cos \omega_s t + 2 \cos 2\omega_s t + 2 \cos 3\omega_s t + \ldots$ The sampling process is a modulation process wherein a sampling wave such as produced by sampling wave generator 2 is modulated by the intelligence bearing signal. Modulating or multiplying an A. C. component of the sampling wave or pulse sequence and a component of the intelligence bearing signal together produces two side bands, one equal in frequency to the sum of the frequency of the sampling wave component and of the frequency of the intelligence bearing signal, the other side band equal in frequency to the difference in frequency between the sampling frequency and the frequency of the intelligence bearing signal. In a practical case, the ratio between the sampling frequency and the cut off frequency of the transmitting medium is generally such that only the first three terms of the expression (a) contribute to the final result. The reason for this is that the side bands produced by the higher harmonics of the sampling wave lie beyond the cut off frequency of the transmitting medium. In most cases, even the second harmonic can be neglected and sometimes it is advantageous not to have it. Therefore, if a Fourier analysis of the sampling wave actually used produces the same first two terms as found in expression (a) the products of the sampling process will be the same as if narrow pulses had been used.

The sampling wave may be made of triangular pulses, rectangular waves, clipped sinusoids or any other shape. The following example, however, relates to the way in which the proper D. C. level for a rectangular wave may be derived. As is well known, the Fourier cosine series for such a wave train is (b) $\quad f(t) = \sum_{n=1}^{n=\infty} \dfrac{\sin \dfrac{n\pi}{2}}{n\pi} \cos n2\pi ft =$ $2/\pi[\cos 2\pi ft - 1/2 \cos 6\pi ft + 1/5 \cos 10\pi ft - \ldots]$ Thus, it is evident that the amplitude of the fundamental is $2/\pi$ and that there is no D. C. term. Therefore, in order to simulate the results obtained by employing narrow pulse sampling a D. C. component must be added having amplitude that is half that of the fundamental or $1/\pi$. The correct wave train thus obtained is represented by the expression (c) $\quad f(t) = 1/\pi + 2/\pi \; [\cos 2\pi ft - 1/3 \cos 6\pi ft + 1/5 \cos 10\pi ft - \ldots]$ This new sampling operation may be performed in an apparatus such as that illustrated in Figure 2. A sampling wave of any desired shape is supplied by sampling wave generator 2 via a coupling condenser 4 to the top of a load resistor 6. The bottom end of the load resistor 6 is connected to the center tap of a potentiometer 8 having one end grounded and the other end connected to a source of negative potential. This is just one way in which the D. C. level of the sampling waves may be determined. The top of the resistor 6 is connected to a cathode 10 of an electron discharge device 12. Resistor 14 is connected between the cathode 10 and ground. A control grid 16 is connected to a suitable source of negative potential which may be a battery 18. The plate 20 is connected to a suitable source of B+ potential via a load resistor 22. A suitable portion of the output voltages provided by the electron discharge device 12 are obtained by connecting an output lead 24 to a suitable intermediate point on the resistor 22. The cathode 10 is connected to a grid 26 of an electron discharge device 28 via a battery or other source of fixed potential 30. The battery has its negative pole connected to the grid 26 and its positive pole connected to the cathode 10. A plate 32 of the electron discharge device 28 is connected to a suitable source of B+ via a load resistor 34. An output lead 36 is connected to an intermediate point on the resistor 34 so as to provide a given portion of the output voltage supplied by the electron discharge device 28. Grids 38 and 40 of the electron discharge devices 12 and 28 are electrically connected together and to a source 42 of intelligence bearing signals.

The operation of the apparatus shown in Figure 2 will now be discussed in connection with the wave forms as shown in Figures 1 and 2A. In Figure 2A the frequency of the sampling wave is shown as being less than the video frequency. Although the relationship between the frequencies is vice versa, the wave as shown is better adapted for purposes of explanation. Assuming that the output of the sampling wave generator 2 is a square wave form such as illustrated in Figure 1, it would normally have a D. C. axis indicated by the dotted line 50. However, as indicated in the above calculation, it is desired that the sampling wave oscillate about an axis indicated by the solid line 52. This may be accomplished by a proper setting of the potentiometer 8. The biases placed on the electron discharge devices 12 and 28 are such that the electron discharge device 12 is cut off when the wave form is above the solid line 52 and that the electron discharge device 28 is cut off when the wave form is below the line 52. These biases are produced as a result of the values of the potential supplied by the batteries 18 and 30 and the potential appearing across the cathode resistor 14.

Assume, for example, that the output for the source of intelligence bearing signals 42 is a sine wave such as illustrated by the wave form 54. During the positive portions of the sampling wave form, electron discharge device 12 is cut off because cathode 10 is too positive. However, the negative bias placed on the grid 26 by the battery 30 is overcome and the electron discharge device 28 operates to amplify the wave form 54 by a large amount, as indicated by portions 56 of the wave form shown in Figure 2A. On the other hand, when the negative portions of the sampling wave are present, the electron discharge device 28 is cut off by the biasing action of the battery 30 and the electron discharge device 12 amplifies the wave form 54 applied to its grid 38. Because the cut off bias is just barely exceeded the amplification factor of the electron discharge device 12 is not large and therefore the wave form 54 will appear at the plate 20 of the electron discharge device 12 at a relatively small amplitude such as illustrated by portion 58 of the wave form shown in Figure 2A. The outputs 24 and 36 thus form a double ended output which may be applied to any transmitting medium.

The gain of the electron discharge device 12 with respect to the gain of the electron discharge device 28 should be in the same ratio as that between the negative portion 60 of the wave form of Figure 1 and the positive portion 62 of the same wave form. If, for some reason, this should not be the case, the output leads 24 and 36 can be connected to suitable intermediate points of the load resistor 22 and 34 respectively.

Normally, when two different signals are to be multiplied by application to different electrodes of the same electron discharge device, the multiplication process is not perfect. The reason for this can be understood by assuming that one of the signals has a constant amplitude and the other signal varies in amplitude. If the resulting change in gain is not proportional to the change in amplitude of the varying signal, then some of this signal will be introduced into the output. This difficulty, however, is overcome by employing a sampling wave having relatively flat tops and bottoms, as indicated by the numerals 64 and 66 in Figure 1. This means that the operating point of the electron discharge device can be set at a linear portion in the output vs. input characteristic, thereby insuring that the desired results will be obtained. In other words, during the positive pulses of the sampling wave illustrated in Figure 1, the grid 26 of the electron discharge 28 is maintained at a constant potential. By suitably adjusting the bias provided by the battery 30 this constant potential can be at a point in the curve where the gain is a desired amount. In a similar way, during the negative pulses 66 of the sampling wave form the bias between the cathode 10 and the grid 16 is held constant, and at a new fixed value for the gain the output is brought about by the application of the wave form 54 to the grid 38.

Figure 3 illustrates another apparatus for generating the sampling wave having the proper D. C. level and for multiplying it with a signal bearing a desired intelligence. Use is made of a special cathode ray tube 70. An electron gun, generally indicated by the numeral 72, projects a line beam of electrons in a vertical plane. Such a gun is shown and described in the U. S. Patent No. 2,434,713 to Mueller. Should it be necessary to overcome any non-linearity of this device, the following expedient may be used. The cathode 74 of this gun is connected to ground by a suitable resistor 76 so that cathode follower action is produced. This means that the total current in the line beam is directly proportional to the amplitude of the intelligence bearing signals applied to a control grid 78 of the electron gun 72 from a source 80.

The line beam of electrons thus projected from the electron gun 72 passes through apertures in a mask 82 and strikes one or the other of targets 84 and 86 so as to generate currents proportional to the total amount of electrons striking the targets in the output leads 88 and 90 respectively. If it is desired to employ a sampling wave such as illustrated in Figure 1, the apertures in this mask 82 are shaped as shown in Figure 3A. The vertical line beam of electrons is indicated by numerals 92. The targets 84 and 86 are electrically separated from one another and are adjacent to one another along a horizontal line indicated by the numeral 94. Therefore, electrons passing through the mask 82 above the line 94 strike the target 86. The apertures in the mask below the line 94 bear the same relation in size and position to the apertures in the mask above the line 94 as those signals of the wave forms shown in Figure 1 below the line 52 bear to those signals of the wave form above the line 52. The line beam of electrons is swept at a uniform line across the mask and target structure thus described by an application of suitably swept voltages to electromagnetic plates 98 and 100. It will be understood that any means for deflecting the line beam of electrons in a horizontal direction may be employed.

The operation of the device shown in Figures 3 and 3A is as follows. When the line beam of electrons 92 is in the position shown in Figure 3A, the current appearing in the output lead 88 is proportional to the height of the aperture opposite the target 84. On the other hand, when the line beam 92 is moved horizontally so that a portion of its passes through the apertures in the lower part of the mask opposite the target 86, a smaller current appears in the output lead 90. Thus, it can be said that the cathode ray tube generates a sampling wave having a suitable D. C. axis. It will be remembered that the intensity of this beam of electrons is proportional to the signals bearing intelligence that are applied to the grid 78. Therefore, the output appearing in the leads 88 and 90 will be proportional to the product of the intelligence bearing signals and the sampling wave represented by the aperture configuration in the mask 82. It will be readily understood that the apertures as shown in the mask 82 in Figure 3A are of a particular sampling wave such as illustrated in Figure 1. However, it is readily apparent that if differently shaped sampling waves are used, apertures having a corresponding shape could be employed.

Having thus described my invention, what is claimed is:

1. A sampler comprising in combination a first electron discharge device having at least a plate, two grids and a cathode, a second electron discharge device having a plate, two grids and a cathode, connections between one grid in said first electron discharge device and a corresponding grid in said second electron discharge device, means for biasing the other grid of said first electron discharge device negatively with respect to ground, means for biasing the other grid of said second electron discharge device negatively with respect to the cathode of said first electron discharge device, a resistor connected between the cathode of said first electron discharge device and ground, the cathode of said second electron discharge device being grounded, and load resistors connected between each of said plates and a source of positive potential.

2. A sampler as described in claim 1 in which a source of carrier waves having a predetermined portion below ground potential is connected to the cathode of said first electron discharge device and a source of intelligence bearing signal is connected to said one grid of said first electron discharge device and said corresponding grid of said second electron discharge device.

References Cited in the file of this patent

UNITED STATES PATENTS

| Number | Name | Date |
|--------|------|------|
| 2,450,445 | Rosencranz | Oct. 5, 1948 |
| 2,498,526 | Bucher | Feb. 21, 1950 |
| 2,499,568 | Bucher | Mar. 7, 1950 |